US012635598B2

(12) United States Patent     (10) Patent No.:   US 12,635,598 B2

Eberly     (45) Date of Patent:    May 26, 2026

(54) CONVERSION SYSTEM FOR ZERO TURN LAWN EQUIPMENT

(71) Applicant: Troy Eberly, Hartville, OH (US)

(72) Inventor: Troy Eberly, Hartville, OH (US)

( * ) Notice: Subject to any disclaimer, the term of this patent is extended or adjusted under 35 U.S.C. 154(b) by 462 days.

(21) Appl. No.: 18/315,648

(22) Filed: May 11, 2023

(65) Prior Publication Data

US 2024/0237573 A1     Jul. 18, 2024

Related U.S. Application Data

(63) Continuation-in-part of application No. 18/154,948, filed on Jan. 16, 2023.

(51) Int. Cl.
    A01D 34/64       (2006.01)
    A01D 34/00       (2006.01)
    *A01D 101/00*      (2006.01)

(52) U.S. Cl.
    CPC ........... A01D 34/64 (2013.01); A01D 34/006 (2013.01); *A01D 2101/00* (2013.01)

(58) Field of Classification Search
    CPC ...... B62D 21/14; A01D 43/107; A01D 34/28; A01D 34/668; B60G 2204/4232; A01B 69/00; A01B 69/007
    USPC ........................................... 56/10.8; 180/233
    See application file for complete search history.

(56) References Cited

U.S. PATENT DOCUMENTS

| | | | | |
|---|---|---|---|---|
| 2,687,606 | A | * | 8/1954 | Greer, Sr. .............. A01D 34/04 |
| | | | | 56/11.9 |
| 6,089,343 | A | * | 7/2000 | Brewer ................ B62D 21/186 |
| | | | | 180/311 |
| 2002/0148211 | A1 | * | 10/2002 | Templeton ............. A01D 34/84 |
| | | | | 56/17.1 |
| 2004/0074686 | A1 | * | 4/2004 | Abend .................. F16H 61/444 |
| | | | | 180/242 |
| 2007/0015619 | A1 | * | 1/2007 | Sasahara .............. B60K 17/046 |
| | | | | 475/178 |
| 2007/0151220 | A1 | * | 7/2007 | Bergsten ................ A01D 67/00 |
| | | | | 56/2 |
| 2009/0182470 | A1 | * | 7/2009 | Garvey ................ A01D 34/662 |
| | | | | 701/50 |
| 2009/0260911 | A1 | * | 10/2009 | Nozaki ................ B60K 17/356 |
| | | | | 180/307 |

FOREIGN PATENT DOCUMENTS

| | | | | |
|---|---|---|---|---|
| WO | WO-2025035211 A1 | * | 2/2025 | ............. B62D 49/06 |

* cited by examiner

*Primary Examiner* — John Olszewski
*Assistant Examiner* — Nathaniel William Watkins
(74) *Attorney, Agent, or Firm* — HARPMAN & HARPMAN

(57) ABSTRACT

A drive wheel and equipment attachment combination for self-propelled hydro-static wheel drive lawn care equipment platforms that converts rear two-wheel drive zero turn equipment with a mower deck to a four-wheel drive with a universal front implement mount lawncare equipment platform and articulated front steering drive frame and equipment mount.

5 Claims, 7 Drawing Sheets

CONVERSION SYSTEM FOR ZERO TURN LAWN EQUIPMENT

This application is a Continuation in Part of Ser. No. 18/154,948, filed Jan. 16, 2023.

BACKGROUND OF THE INVENTION

1. Technical Field

This invention related to self-propelled riding or standing lawncare vehicles having independent direct drive rear wheels and centrally positioned under frame mower deck attachments.

2. Description of Prior Art

There are no known prior art drive wheel and equipment mounting conversions for existing lawncare direct drive and under frame mower equipment mounts except for the applicant's pending application, the benefit of priority claimed herein.

SUMMARY OF THE INVENTION

A conversion assembly and system for modifying an existing self-propelled rear wheel direct drive lawn equipment platform to a four-wheel drive format with a front mounted universal equipment implement support and drive attachment. The conversion replaces existing front caster wheel assemblies and support frame with a pair of independently powered hydrostatic driven front drive wheels with a front mounting implement attachment and drive powered by an existing or auxiliary hydrostatic power supply. A deployable frame stand and off set weights are provided to support the frame during conversion.

DETAILED DESCRIPTION OF THE INVENTION

Figure 1:
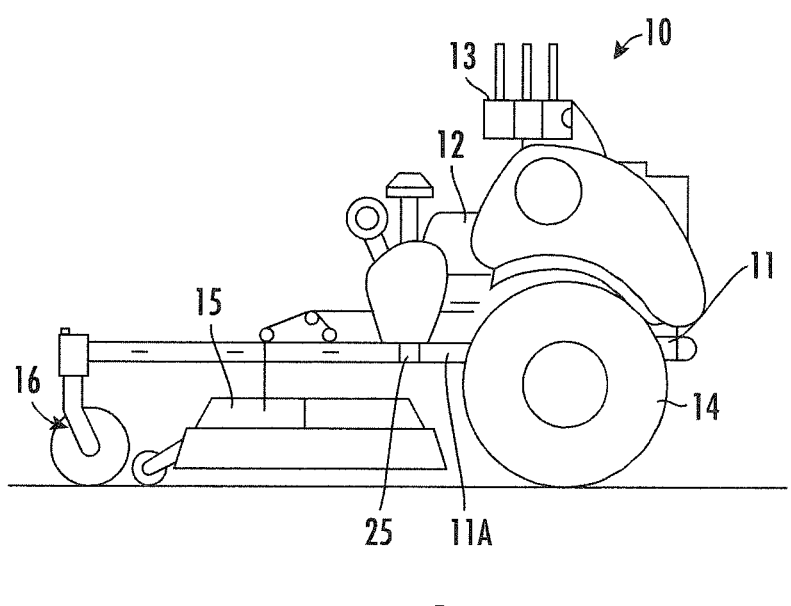
FIG. 1 is a side elevational view of a conventional rear wheel drive lawncare vehicle with front caster wheels.
Figure 2:
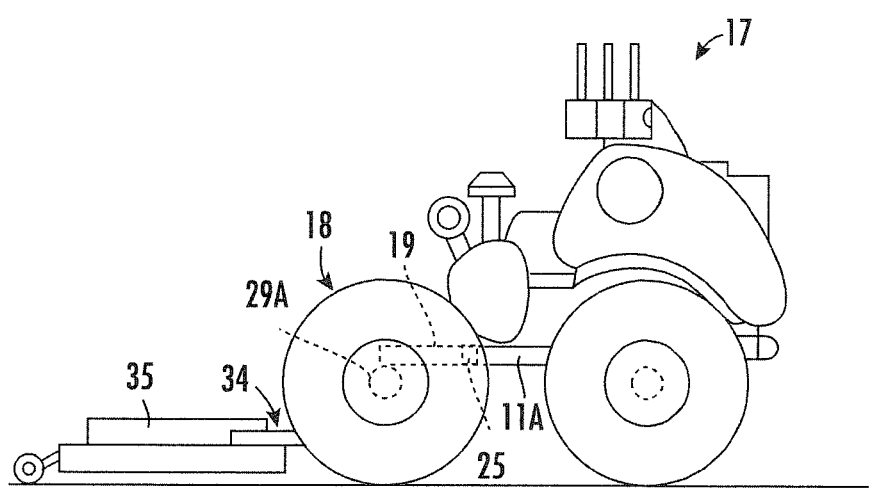
FIG. 2 is a side elevational view of a converted lawncare vehicle now with four-wheel drive and a front implement (mower deck) mount.

Referring now to FIG. 1 of the drawings, a conventional two-wheel rear drive zero turn lawncare equipment 10 can be seen with a frame 11, an engine 12 and standup user controls 13. A set of power drive rear wheels 14 and an under-frame mower deck 15 having a pair of forward support frame caster wheels 16. The mower deck 15 is removably supported under the frame 11 and powered by a conventional drive pulley and belt assembly, not shown.

Figure 3:
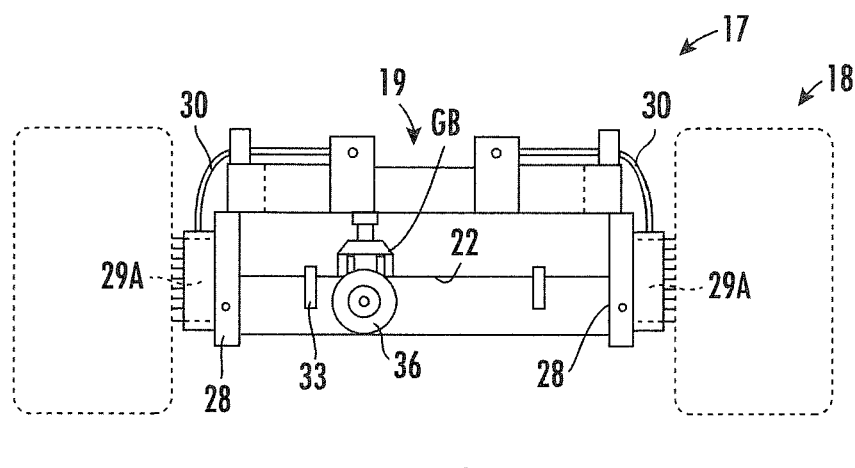
FIG. 3 is a partial enlarged front elevational view of a drive wheel conversion and universal front equipment mount.
Figure 4:
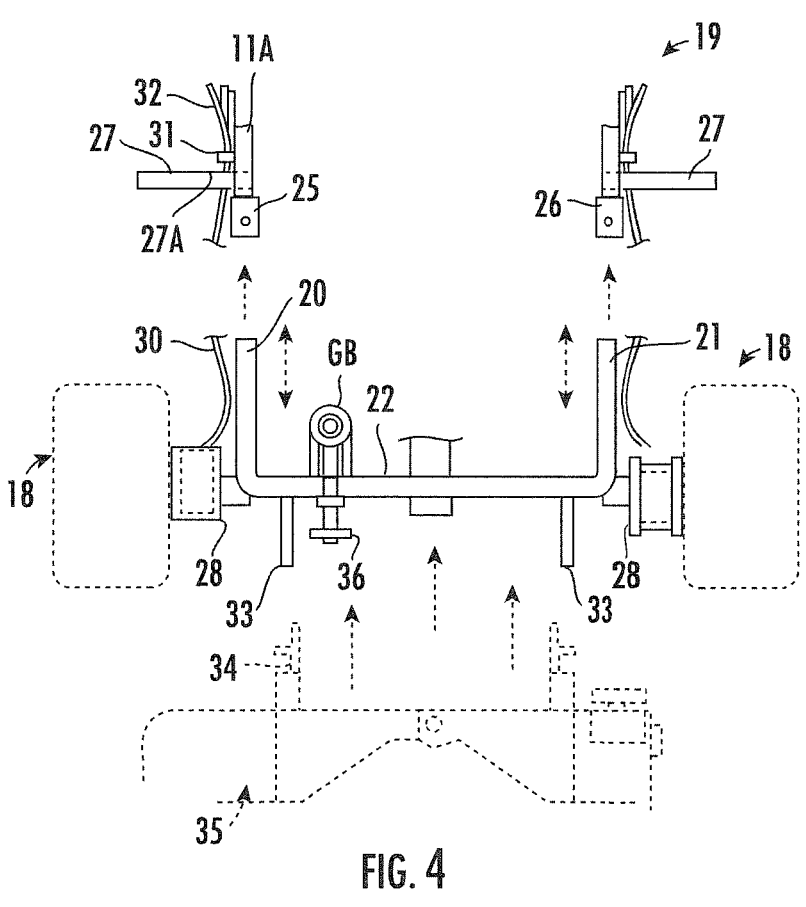
FIG. 4 is a partial enlarged top plan view of the converted drive wheel front equipment mount with the mower deck shown in broken lines for positional attachment thereto.
Figure 5:
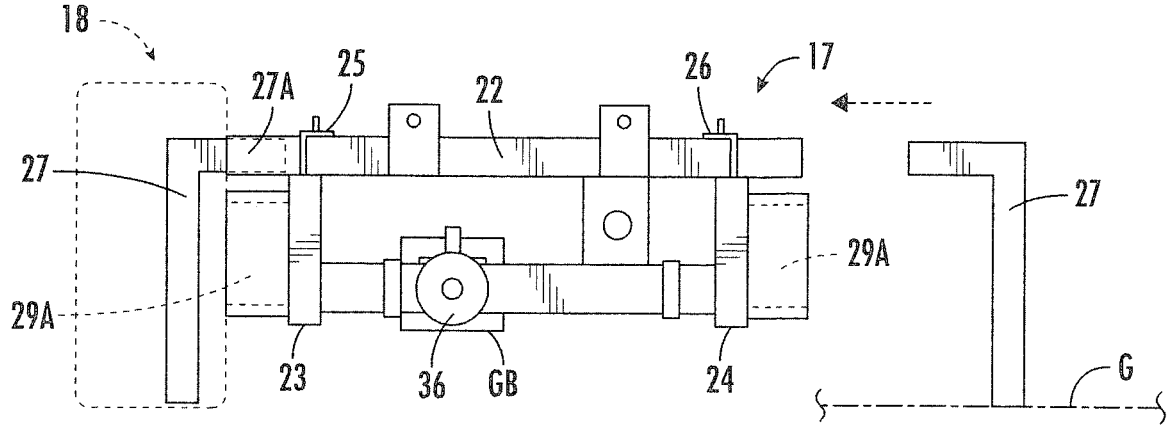
FIG. 5 is an enlarged front elevational view of the conversion drive wheel assembly with an auxiliary frame support shown in solid and broken lines.

A converted four-wheel drive lawncare equipment 17 of the invention can be seen in FIGS. 2-6 of the drawings wherein a pair of auxiliary hydrostatic driven wheel assemblies 18 are secured to a replacement front frame assembly 19 of the conversion having a pair of spaced parallel main extension frame elements 20 and 21 with a cross support frame element 22 and correspondingly oppositely disposed hydraulic motor wheel mounts 23 and 24 as best seen in FIGS. 3, 4 and 5 of the drawings. The main frame extension elements 20 and 21 are configured for registration into receivers 25 and 26 on a modified existing equipment frame 11A, seen graphically in FIGS. 1, 2 and 4 of the drawings. It will be evident that the specific receiver configurations 25 and 26 may be varied depending on equipment venue and design and therefore are not limited to one so illustrated in the present design.

The modified equipment frame 11A may have auxiliary deployable support legs 27 which, in this example, extend from corresponding fittings 27A on the frame 11A with each being an L-shaped extending outwardly and downwardly leg for ground support engagement as seen in FIGS. 3 and 4 of the drawings in solid and broken lines during conversion with existing frame 11 and removal of caster wheel assemblies 14.

Figure 6:
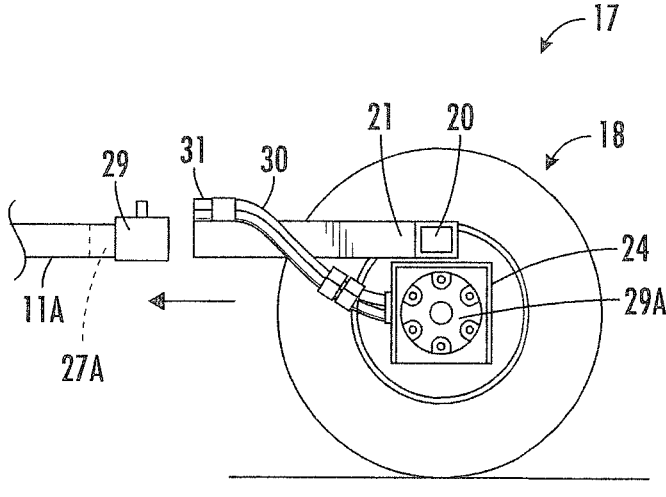
FIG. 6 is an enlarged partial side elevational view of a conversion drive wheel assembly with hydrostatic motor and support frame with hydraulic line quick connect fittings.

The auxiliary drive wheel assemblies 18 secured to respective wheel frame motor mounts 28 each have wheels 29 and hydraulic motors 29A, best seen in FIGS. 3, 4 and 6 of the drawings. Each of the hydraulic motors 29A have a pair of hydraulic supply lines 30 with quick release line fittings 31 for communication with hydraulic lines 32 of the lawn equipment 10 which provides quick and easy connection during conversion. It will be apparent that independent electric drive motors, not shown, could be substituted for hydraulic drive motors 29A and alternately an electric drive hydraulic pump could be used in this example.

A pair of apertured equipment support brackets 33 extend from the fabricated frame mounts 28 and are configured to registerably engage and support and implement mounting extensions 34 on a, in this example, mower deck 35 shown in broken lines in FIG. 4 of the drawings.

The implement power take off illustrated generally as a drive pulley assembly 36 has a 90-degree gear box GB to convert the drive belt to the required orientation for existing implements known in the industry.

It will be evident from the above description that the so modified conventional two-wheel drive zero turn lawncare equipment 10 can easily and quickly be converted to a superior four-wheel drive vehicle with a more adaptable and usable front implement mount with the hereinbefore described conversion assembly of the invention.

Figure 7:
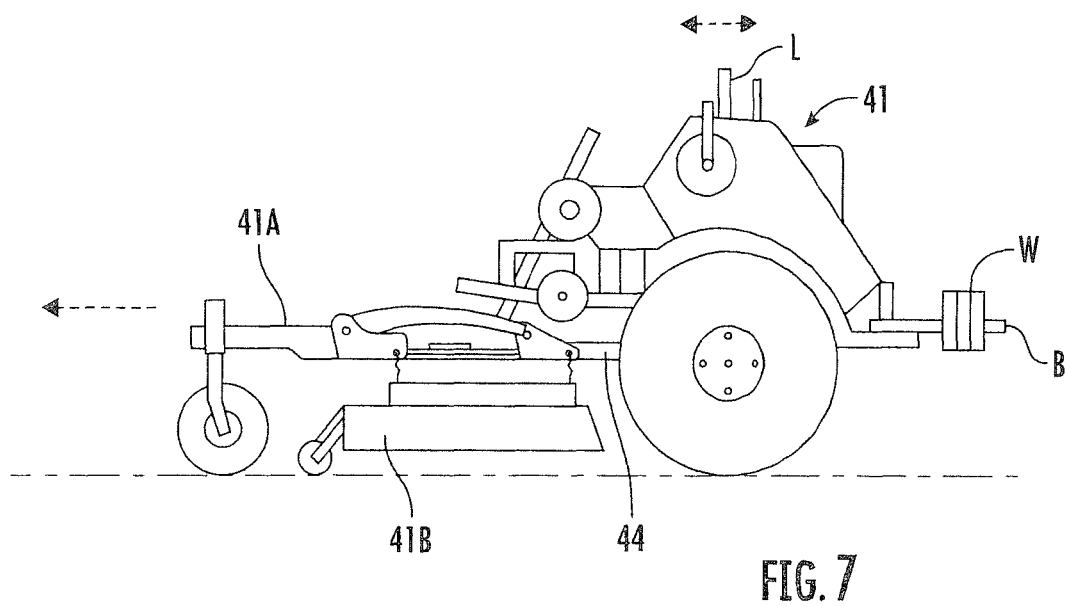
FIG. 7 is a side elevational view of a conventional standup rear drive lawn care vehicle with front caster wheels.
Figure 8:
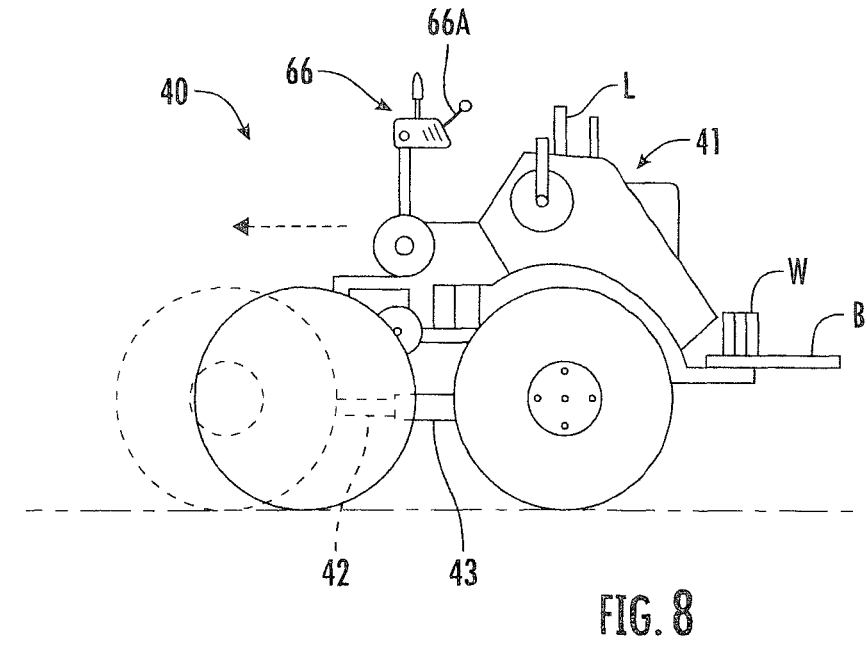
FIG. 8 is a side elevational view of an alternate converted standup lawn care vehicle to a four-wheel drive and articulated front steering assembly.

Referring now to FIGS. 7-12 of the drawings, an alternate embodiment of the invention can be seen disclosing a combination four-wheel drive, skid steer and articulated front steering convertible assembly 40. The convertible assembly 40 allows for the conversion of a two-wheel rear drive standup lawn care equipment 41, as seen in FIG. 7 of the drawings, to either a four-wheel drive skid steer configuration or an articulated front drive wheel steering configuration as illustrated in FIG. 8 of the drawings.

The conversion assembly 40 comprises a replacement frame portion 42 configured for registration into receivers 43 on a modified existing lawn care equipment frame 44 and a dual drive wheel and steering assembly 45 pivotally secured thereto. The dual wheel drive steering assembly 45 has spaced parallel upper and lower frame elements 46A and 46B with end interconnecting supports 47 with independent hydrostatic drive wheel assemblies 48 as set forth in the primary form of the invention's wheel assembly 18 to afford conversion to a four-wheel drive platform.

A tubular telescopically adjustable center support 49 extends from under the upper frame element 46A having a slidable disposed extension 50 with an end pivot engagement fitting 51.

Correspondingly, the frame portion 42 has a fixed center pivot pin receiver 52 for alignment with the end pivot engagement fitting 51 by a pivot pin bolt 53 as will be well understood by those skilled in the art. A pair of angularly disposed frame elements 54A and 54B extend from the pivot pin receiver 52 with receiver frame inserts 55 on the respective free ends. The receiver inserts 55 selectively secure the convertible assembly 40 to the modified frame 44 of the lawn care equipment 41, as noted.

Figure 10:
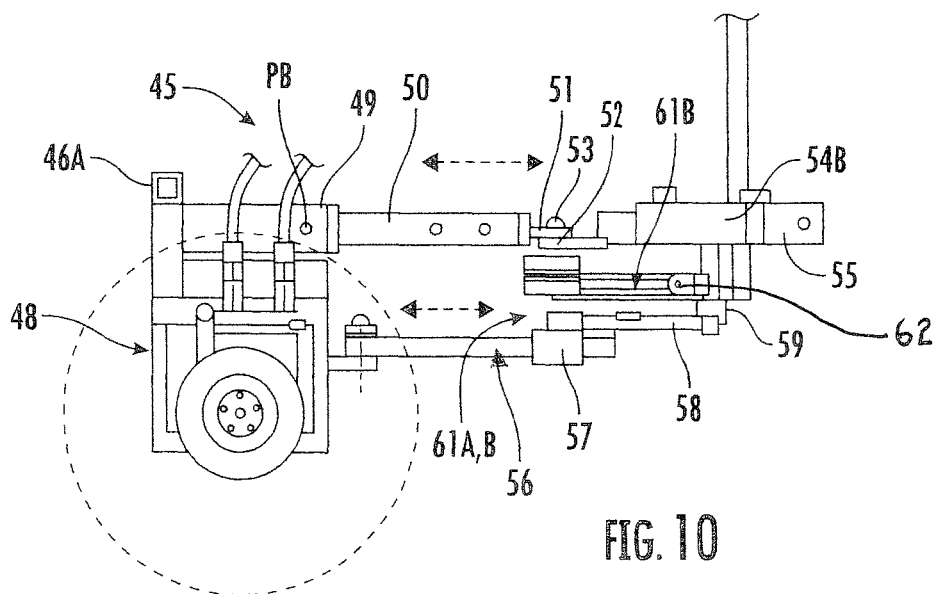
FIG. 10 is a partial enlarged side elevational view thereof.
Figure 11:
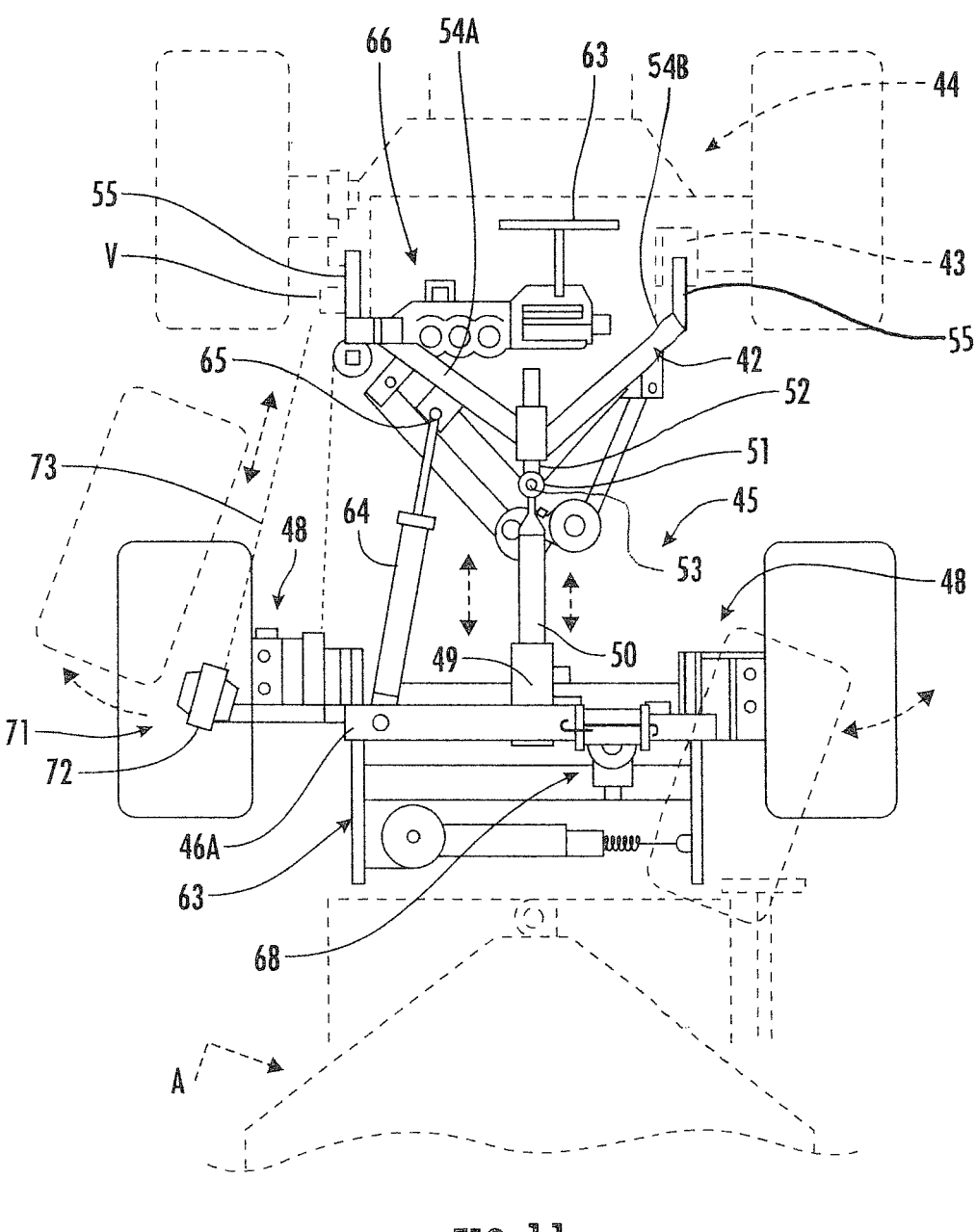
FIG. 11 is a partial enlarged top plan view of the converted articulated four-wheel drive and steering with the lawn care vehicle and front mower assembly shown in broken lines.
Figure 12:
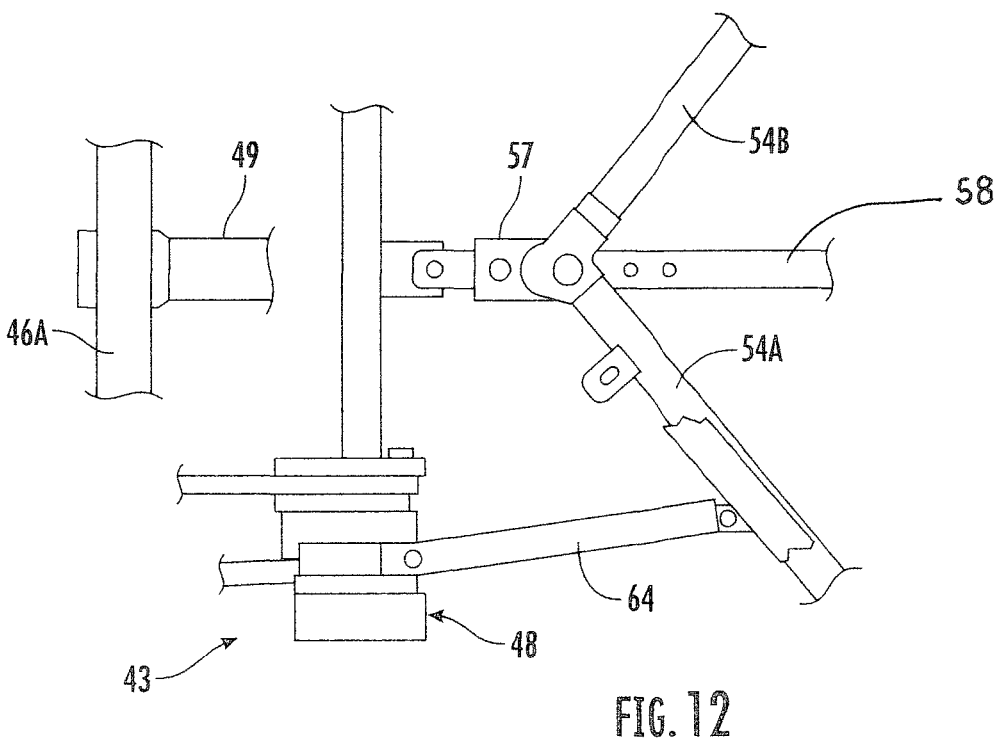
FIG. 12 is a partial enlarged top plan view of the idler pulley support and frame locking bar in in now extended fixed position.
Figure 13:
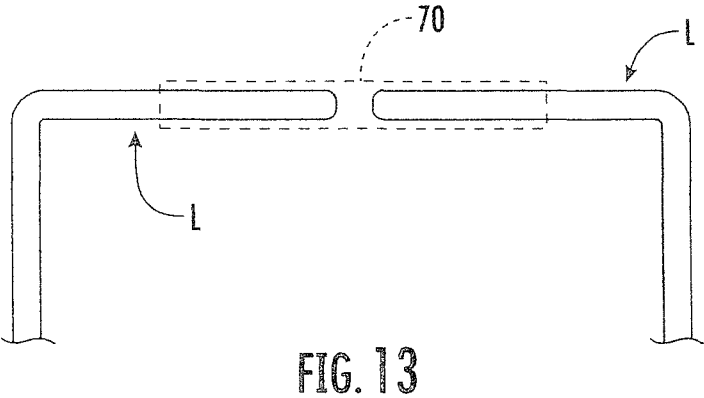
FIG. 13 is an enlarged front elevational view of conventional control levers with an integrated connecting cover in broken lines of the conversion.

An adjustable extendable lower pulley support arm assembly 56 is, in turn, pivotally secured from the center of the lower frame element 46B as seen in FIGS. 10, 11 and 12 of the drawings. A slidable bracket 57 of the arm assembly 56 has a pair of angularly extending frame arms 58 which are in turn secured at their respective ends to depending brackets 59 from the corresponding frame elements 54A and 54B. A pair of idler pulley arm assemblies 61A and 61B are selectively secured to mounting pins 62 on the depending brackets 59 for idle pulley engagement of a belt driven power take off assembly 62 for a front equipment mounted 63, shown in broken lines in FIG. 11.

The idler pulley assemblies 61A and 61B have appropriate spring attachments as will be evident and well known to those skilled in the art.

When the convertible assembly 40 is initially attached to the standup lawn care equipment 41 for conversion, the existing caster wheel frame 41A and attached mower deck 41B are removed from engagement with the frame receivers. In this example, multiple balance weights W are used on an extending support bars B at the rear of the standup lawn care equipment 41 illustrated in FIGS. 7 and 8 of the drawings to act as a counter weight during the conversion process thereby maintaining the position of the lawn care equipment 41 for insertion of the conversion assembly 40 as hereinbefore described.

As noted, the conversion frame portion 42 with the end receiver inserts 55 are inserted and locked into the lawn care equipment modified frame shown in broken lines in FIG. 11 of the drawings. A frame locking bracket 64 is positioned between dual wheel drive and steering assembly 45 and one of the angularly disposed frame elements 54A, as best seen in FIG. 12 of the drawings, thereby maintaining the conversion wheel assembly 40 in a fixed four-wheel drive mode with the independent hydrostatic drive wheel assemblies 48 connected to the existing hydraulic supply and being controlled by modified existing standup user control levers L as will be disclosed in greater detail hereinafter.

To effectively convert to an articulated front steering configuration, the following steps are taken.

The locking bracket 64 is removed and the telescopically adjustable center support extension 50 is unlocked and extended while maintaining its pivot pin and engagement fitting 51 connection to the frame portion 42, seen in FIG. 11 of the drawings. Removed locking pin bolts PB are then repositioned in aligned apertures securing the extended center support pivot extension 50 in extended position. The pulley support arm assembly 56 is slidably extended maintaining frame arms 58 and alternate to depending brackets 59 as hereinbefore described.

The pair of idler pulleys and arm assemblies 61A and 61B are secured between the respective mounting pins 62 from the brackets 59 and fittings on the respective frame assembly elements 58.

The idler pulley assemblies 61A and 61B are so positioned as to maintain a drive belt position for power transfer for a variety of front mounted accessory attachments movably positioned on a support and power take off attachment mounting assembly 63.

Figure 9:
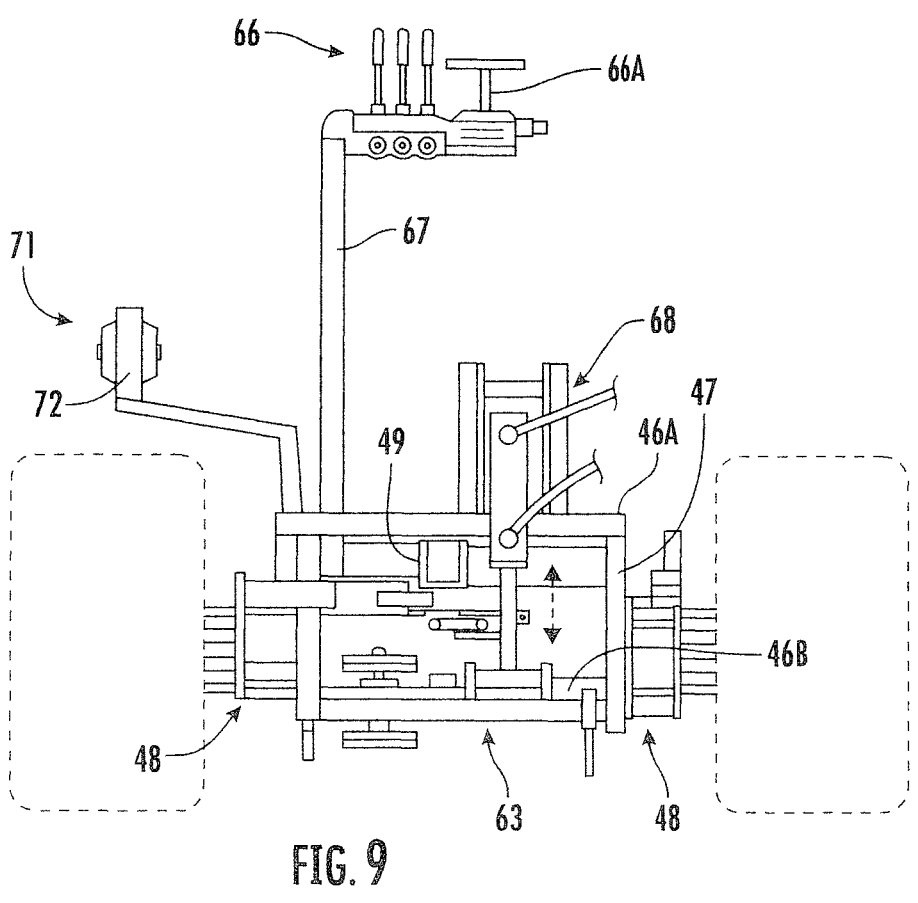
FIG. 9 is a partial enlarged front elevational view of the articulated front steering of the four-wheel drive lawn care vehicle conversion.

A steering hydraulic piston and cylinder assembly 64 is attached from the dual drive assembly frame to a pivot pin fitting 65 on one of the angularly disposed frame elements 54A and 54B. In this configuration, a hydraulic controller valve assembly 66 is provided having a control valve lever 66A for steering and front equipment mounting 63 for an attachment A. The control valve assembly 66 is mounted on an upstanding offset arm bracket 67 as seen in FIGS. 9 and 11 of the drawings. It will be evident that for the attachment A elevation that a hydraulic piston and cylinder assembly 68 is required and in this instance mounted vertically on the upper drive wheel assembly element 46A and to the front equipment mounting assembly 63, allowing in this example raising and lowering of the illustrated attachment A shown in broken lines in FIG. 11 of the drawings.

In converted four wheel articulated steering configuration, the standard individual drive wheel control levers L are, in this instance, secured together by a covering 70 as seen in FIG. 12 of the drawings, providing variable propulsion in both forward and rear direction to both sets of independently powered dual wheels thereby allowing for the use of the articulated steering of the pivoted front drive wheel assembly and its associated equipment mount 63 as hereinbefore described.

The utilization of auxiliary drive wheels with independent hydrostatic motors on an extensible articulated front drive steering and power drive mount 45 provides an improved and adaptable lawncare equipment. It will be understood that the articulated front drive steering configuration that steering will also require interengaged drive wheel speed control when turning by slowing the relative inside wheels down to achieve an efficient "nonskid steer" effectively. In this example, a simple cable engagement link assembly 71 used to react to a turn having a take up reel 72 and cable 73 attached to control valving V effectively varying the respective drive wheel speed during a turn. It will be evident that other variations of this may be used and this is illustrated as an example of same.

As evident from the above description, it will be seen that a substitution of fabrication components under the doctrine of equivalency is available and stating such substitutions are of equal use consideration.

The key element of the hereinbefore described invention is the utilization of the existing zero turn two-wheel drive lawncare equipment with the under-frame mowing imple- ment to a four-wheel drive articulated front drive and steering on implement supported configuration allowing for broader equipment use and adaptation than before.

It will thus be seen that a new and novel conversion system for zero turn standup lawn equipment has been illustrated and described and it will be apparent to those skilled in the art that various changes and modifications may be made therein without departing from the spirit of the invention. Therefore I claim:

The invention claimed is:

1. A four-wheel drive steering conversion for use with a zero turn two-wheel drive, lawn equipment including, an equipment frame, an engine, rear drive wheels, front caster wheels and a mower deck, the four-wheel drive conversion comprising, a replacement front frame having a lawn equipment engagement portion and a dual drive wheel steering portion, is movable from a first fixed position to a second articulated steering pivot position in spaced relation to said lawn equipment engagement portion and said lawn equipment, a hydraulic piston and cyl- inder steering assembly is pivotally secured between said lawn equipment engagement portion and said dual drive wheel and steering portion, a control valve in communication therewith, frame receiver inserts on said lawn equipment engagement portion, a pair of independent drive wheel assemblies on said dual drive wheel steering portion and a front equipment mounting assembly, a center support extension having an adjustable pivot arm fitting, a fixed center end engagement fitting on said lawn equipment engagement portion in aligned regis- tration with a center pivot pin receiver, a control valve assembly in connection with said dual drive wheel steering portion, a pair of angularly disposed frame elements extending from said center end engagement fitting; depending mounting brackets on said respective frame elements and idler, pulley assemble on said depending mounting brackets for select engagement with said pulley support frame arms when so engaged.

2. The four-wheel drive steering conversion set forth in claim 1 wherein said lawn equipment engagement portion further comprises: a pulley support arm extending from and pivotally secured to said dual drive wheel steering portion having a sliding bracket with a plurality of angularly dis- posed pulley support frame arms extending therefrom, for engagement with a power take off drive belt extending there about and to a source of rotational power.

3. The four-wheel drive steering conversion set forth in claim 1 wherein a hydraulic piston and cylinder steering assembly is pivotally secured between said lawn equipment engagement portion and said dual drive wheel and steering portion, a control valve in communication therewith.

4. The four-wheel drive steering conversion set forth in claim 1 wherein a power accessory take off assembly extends from said dual drive wheel steering portion with a hydraulic piston and cylinder lift for raising and lowering said take off assembly.

5. The four-wheel drive steering conversion set forth in claim 1 wherein said control valve assembly comprises: a control valve lever for steering and elevation of the front equipment mounting assembly.

\* \* \* \* \*